US008752096B2

(12) United States Patent
Bi et al.

(10) Patent No.: US 8,752,096 B2
(45) Date of Patent: Jun. 10, 2014

(54) APPARATUS AND METHOD OF COMMUNICATIONS

(75) Inventors: Haifeng Bi, San Antonio, FL (US); Jeffrey Multach, San Antonio, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 1319 days.

(21) Appl. No.: 12/195,217

(22) Filed: Aug. 20, 2008

(65) Prior Publication Data

US 2010/0050213 A1    Feb. 25, 2010

(51) Int. Cl.
H04N 7/173    (2011.01)
G06F 15/173   (2006.01)

(52) U.S. Cl.
USPC ............. 725/62; 725/110; 725/122; 709/223; 709/224

(58) Field of Classification Search
CPC .............. H04N 21/4888; H04N 21/60; H04N 21/6131; H04N 21/6137; H04N 21/6181; H04N 21/63; H04N 1/00217; H04N 7/26941; H04N 1/00312
USPC ............... 725/62, 73, 86, 110, 122, 123, 131, 725/139, 151; 709/223, 224, 227–229
See application file for complete search history.

(56) References Cited

U.S. PATENT DOCUMENTS

| 2004/0052243 | A1 | 3/2004 | Bostrom et al. | |
| 2005/0054380 | A1 | 3/2005 | Michaelis | |
| 2007/0061397 | A1* | 3/2007 | Gregorat et al. | 709/203 |
| 2007/0192465 | A1* | 8/2007 | Modarressi | 709/223 |

FOREIGN PATENT DOCUMENTS

EP    2114057 A1 * 11/2009

OTHER PUBLICATIONS

Network Working Group Request for Comments: 5194 (RFC 5194)—"Framework for Real-Time Text over IP Using the Session Initiation Protocol (SIP)" —A. van Wijk; G. Gybels; Jun. 2008.*
Network Working Group Request for Comments: 4103 (RFC4103)—"RTP Payload for Text Conversion"—G. Hellstrom; P. Jones; Jun. 2005.*
Real-time Text Taskforce—"R3TF has been lauched today! The Real-Time Text Taskforce has been launched on Jul. 30, 2008. Everybody is welcome to participate with the R3TF."—Internet Archive WayBackMachine—http://www.realtimetext.org/.*
Van Wijk et al., "Framework for Real-Time Text over IP Using the Session Initiation Protocol (SIP)", pp. 1-31; http://tools.ietf.org/html/rfc5194; web site last visited Aug. 20, 2008.

(Continued)

Primary Examiner — Hai V Tran
(74) Attorney, Agent, or Firm — Guntin & Gust, PLC; Ed Guntin

(57) ABSTRACT

A system that incorporates teachings of the present disclosure may include, for example, an Internet Protocol Multimedia Subsystem (IMS) communication system having at least one network element to receive from an Set-Top Box (STB) a communication identifier of a targeted communication device (TCD) to conduct a communication session utilizing a real-time Text over Internet Protocol (ToIP), determine whether the TCD operates according to one of a circuit-switched protocol (CSP) or ToIP, responsive to detecting that the TCD operates according to the CSP, establish the communication session between the STB and the TCD, transcode for the TCD ToIP communications initiated by the STB to CSP communications, and transcode for the STB CSP communications initiated by the TCD to ToIP communications. Other embodiments are disclosed.

26 Claims, 9 Drawing Sheets

(56) References Cited

OTHER PUBLICATIONS

Yahoo! Messenger, "Chat Instant Message, SMS, PC Calls and More", 2 pages; http://messenger.yahoo.com/; web site last visited Aug. 20, 2008.

Microsoft Corp., "Windows Live Messenger", 1 page; http://get.live.com/messenger/overview; web site last visited Aug. 20, 2008.

Google, "A Google Approach to Instant Communications", 1 page; http://www.google.com/talk/, web site last visited Aug. 20, 2008.

* cited by examiner

300

600

US 8,752,096 B2

APPARATUS AND METHOD OF COMMUNICATIONS

FIELD OF THE DISCLOSURE

The present disclosure relates generally to communication technologies and more specifically to an apparatus and method of communications.

BACKGROUND

Currently consumers can communicate by way of voice or data messages over circuit-switched or packet-switched communication networks. Circuit-switched communication networks enable voice or data communications using fixed bandwidth circuits, while packet-switched communication networks enable voice or data communications using dynamic bandwidth circuits. Fixed bandwidth circuits can be less prone to communication issues such as jitter and transmission path delays encountered with dynamic bandwidth connection, while dynamic bandwidth connection can provide better bandwidth utilization than fixed bandwidth circuits.

DETAILED DESCRIPTION

Figure 1:
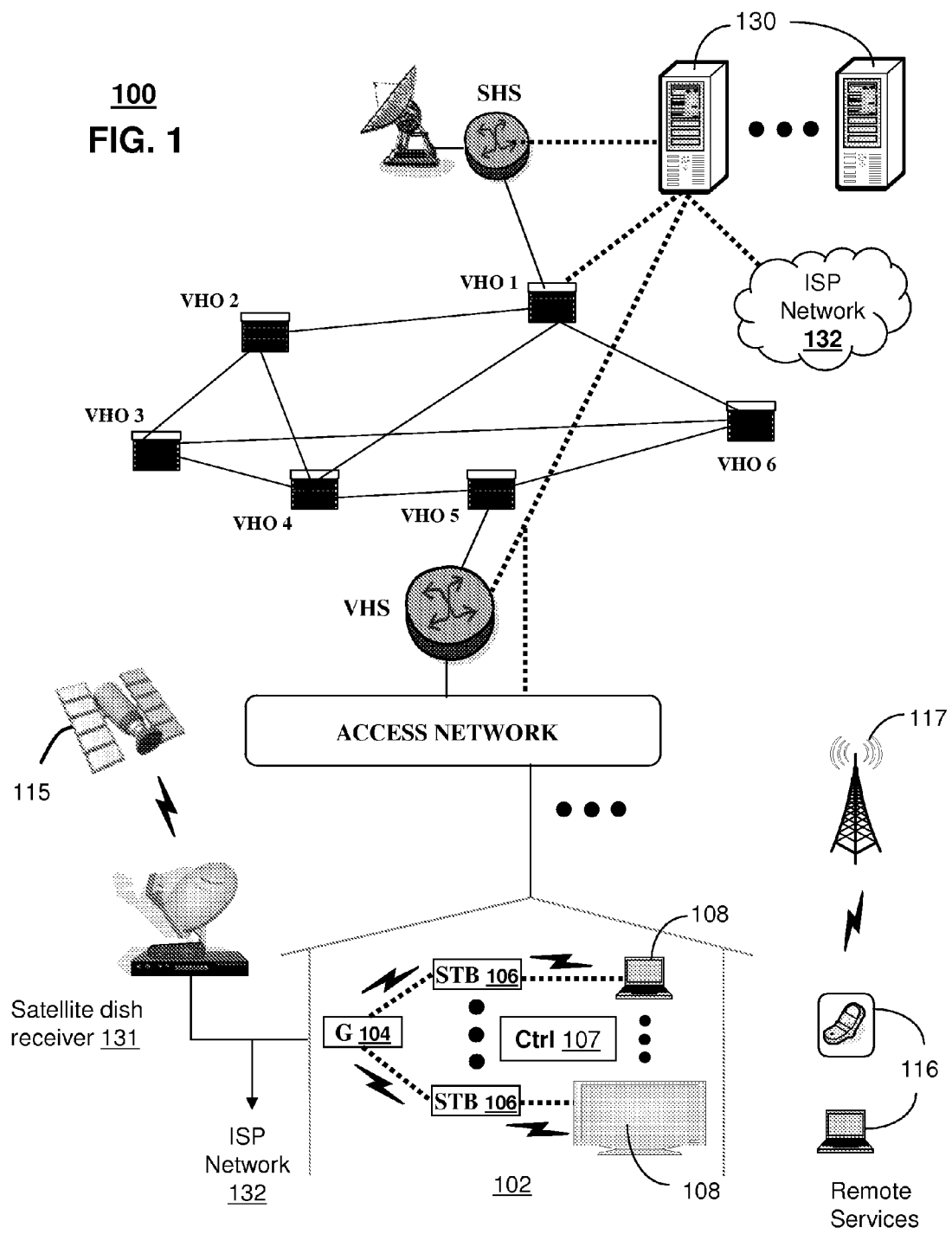
FIGS. 1-4 depict illustrative embodiments of communication systems that provide media services.

One embodiment of the present disclosure entails an Internet Protocol Multimedia Subsystem (IMS) communication system having at least one network element to receive from a Set-Top Box (STB) a communication identifier of a targeted communication device to conduct a communication session utilizing a real-time Text over Internet Protocol (ToIP) such as defined by the IETF (Internet Engineering Task Force) in RFC (Request For Comment) 5194, International Telecommunications Union—Telecommunications standardization sector (ITU-T) V.151, and subsequent and future derivatives. The controller can be adapted to determine whether the targeted communication device operates according to one of a circuit-switched protocol or ToIP. Responsive to detecting that the targeted communication device operates according to the circuit-switched protocol, the controller can be adapted to establish the communication session between the STB and the targeted communication device, wherein the communication session operates in part as a ToIP communication session and operates in part as a circuit-switched communication session, transcode for the targeted communication device ToIP communications initiated by the STB to circuit-switched protocol communications, and transcode for the STB circuit-switched protocol communications initiated by the targeted communication device to ToIP communications. Responsive to detecting that the targeted communication device operates according to ToIP, the controller is adapted to establish the communication session between the STB and the targeted communication device according to ToIP.

Another embodiment of the present disclosure entails a communication system having at least one network element to receive from a first communication device a communication identifier of a second communication device to conduct a communication session utilizing ToIP, and determine whether the second communication device operates according to one of a circuit-switched protocol (CSP) or ToIP. Responsive to detecting that the second communication device operates according to CSP and transcoding from ToIP to CSP and CSP to ToIP is an available resource, the least one network element is adapted to establish the communication session between the first and second communication devices, transcode for the second communication device ToIP communications initiated by the first communication device to CSP communications, and transcode for the first communication device CSP communications initiated by the second communication device to ToIP communications. Responsive to detecting that the second communication device operates according to ToIP, the least one network element is adapted to establish the communication session between the first and second communication devices according to ToIP.

Yet another embodiment of the present disclosure entails a first communication device having a controller to receive a request to engage in a communication session, present a graphical user interface (GUI) prompting a communication identifier, receive the communication identifier of a second communication device, submit a request to a communication system to engage in a ToIP communication session with the second communication device, and present in the GUI a communication area for receiving messages from and transmitting messages to the second communication device. The communication system can be adapted to determine whether the second communication device operates according to one of a circuit-switched protocol or ToIP, responsive to detecting that the second communication device operates according to the circuit-switched protocol, establish the communication session between the first and second communication devices, transcode for the second communication device ToIP communications initiated by the first communication device to circuit-switched protocol communications, and transcode for the first communication device circuit-switched protocol communications initiated by the second communication device to ToIP communications.

Another embodiment of the present disclosure entails a first communication device having a controller to receive a request to engage in a communication session, present a graphical user interface (GUI) prompting a communication identifier, receive the communication identifier of a second communication device, determine whether the second communication device operates according to one of a circuit-switched protocol or ToIP, responsive to detecting that the second communication device operates according to the circuit-switched protocol, and the second communication device corresponds to a telecommunications device for the deaf (TDD), enable a voice codec for engaging in a communication session with the TDD, and establish the communication session with the TDD utilizing the voice codec. Responsive to detecting that the second communication device operates according to ToIP, the controller is further adapted to establish the communication session with the second communication device according to ToIP.

FIG. 1 depicts an illustrative embodiment of a first communication system 100 for delivering media content. The communication system 100 can represent an Internet Protocol Television (IPTV) broadcast media system. In a typical IPTV infrastructure, there is a super head-end office (SHO) with at least one super headend office server (SHS) which receives national media programs from satellite and/or media servers from service providers of multimedia broadcast channels. In the present context, media programs can represent audio content, moving image content such as videos, still image content, and/or combinations thereof. The SHS server forwards IP packets associated with the media content to video head-end servers (VHS) via a network of aggregation points such as video head-end offices (VHO) according to a common multicast communication method.

The VHS then distributes multimedia broadcast programs via an access network to commercial and/or residential buildings 102 housing a gateway 104 (e.g., a residential gateway or RG). The access network can represent a bank of digital subscriber line access multiplexers (DSLAMs) located in a central office or a service area interface that provide broadband services over optical links or copper twisted pairs to buildings 102. The gateway 104 distributes broadcast signals to media processors 106 such as Set-Top Boxes (STBs) which in turn present broadcast selections to media devices 108 such as computers or television sets managed in some instances by a media controller 107 (e.g., an infrared or RF remote control). Unicast traffic can also be exchanged between the media processors 106 and subsystems of the IPTV media system for services such as video-on-demand (VoD). It will be appreciated by one of ordinary skill in the art that the media devices 108 and/or portable communication devices 116 shown in FIG. 1 can be an integral part of the media processor 106 and can be communicatively coupled to the gateway 104. In this particular embodiment, an integral device such as described can receive, respond, process and present multicast or unicast media content.

The IPTV media system can be coupled to one or more computing devices 130 a portion of which can operate as a web server for providing portal services over an Internet Service Provider (ISP) network 132 to fixed line media devices 108 or portable communication devices 116 by way of a wireless access point 117 providing Wireless Fidelity or WiFi services, or cellular communication services (e.g., GSM, CDMA, UMTS, WiMAX, etc.).

Another distinct portion of the one or more computing devices 130 can be used as a transcoder 130 that utilizes common transcoding technology to transcode ToIP messages generated by a communication device of the first communication system 100 (e.g., an STB, a computer, a fixed-line phone, etc.) to circuit-switch protocol (CSP) messages directed to a non-ToIP communication device. Similarly, the transcoder 130 can transcode CSP messages generated by the non-ToIP (or CSP) communication device to ToIP messages for consumption by the ToIP communication device. It will be appreciated by one of ordinary skill in the art that the transcoder 130 can be utilized in the first communication system 100 for any communication device (ToIP, CSP or otherwise) whether or not said devices are operated by subscribers of the first communication system.

A satellite broadcast television system can be used in place of the IPTV media system. In this embodiment, signals transmitted by a satellite 115 can be intercepted by a satellite dish receiver 131 coupled to building 102 which conveys media signals to the media processors 106. The media receivers 106 can be equipped with a broadband port to the ISP network 132. Although not shown, the communication system 100 can also be combined or replaced with analog or digital broadcast distributions systems such as cable TV systems.

Figure 2:
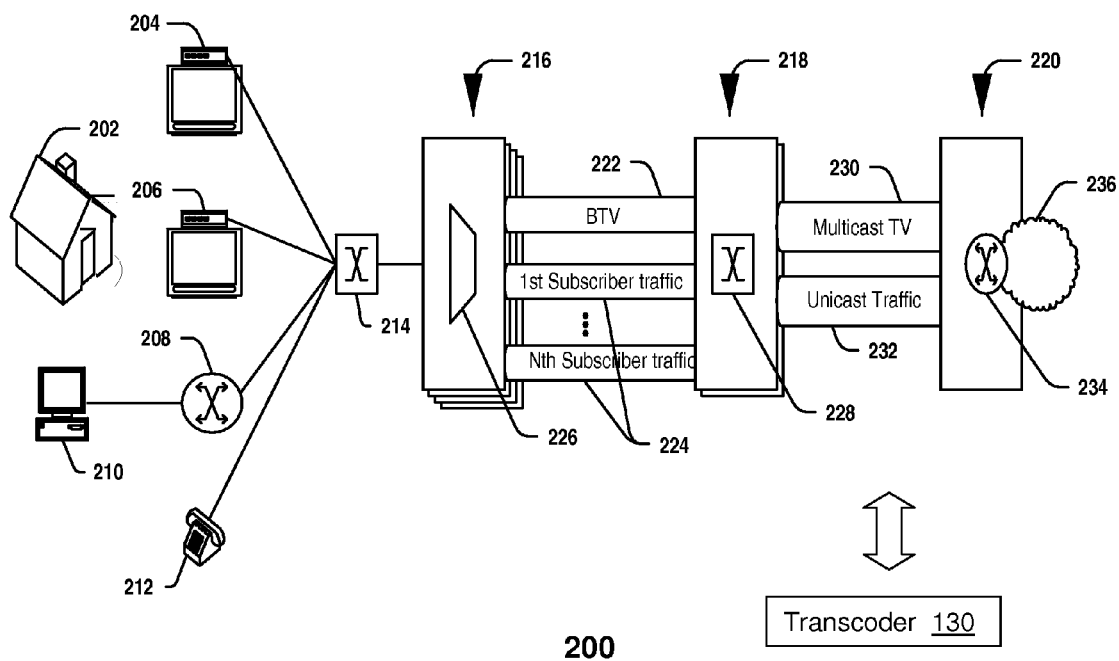

FIG. 2 depicts an illustrative embodiment of a second communication system 200 for delivering media content. Communication system 200 can be overlaid or operably coupled with communication system 100 as another representative embodiment of said communication system. The system 200 includes a distribution switch/router system 228 at a central office 218. The distribution switch/router system 228 receives video data via a multicast television stream 230 from a second distribution switch/router 234 at an intermediate office 220. The multicast television stream 230 includes Internet Protocol (IP) data packets addressed to a multicast IP address associated with a television channel. The distribution switch/router system 228 can cache data associated with each television channel received from the intermediate office 220.

The distribution switch/router system 228 also receives unicast data traffic from the intermediate office 220 via a unicast traffic stream 232. The unicast traffic stream 232 includes data packets related to devices located at a particular residence, such as the residence 202. For example, the unicast traffic stream 232 can include data traffic related to a digital subscriber line, a telephone line, another data connection, or any combination thereof. To illustrate, the unicast traffic stream 232 can communicate data packets to and from a telephone 212 associated with a subscriber at the residence 202. The telephone 212 can be a Voice over Internet Protocol (VoIP) telephone. To further illustrate, the unicast traffic stream 232 can communicate data packets to and from a personal computer 210 at the residence 202 via one or more data routers 208. In an additional illustration, the unicast traffic stream 232 can communicate data packets to and from a set-top box device, such as the set-top box devices 204, 206. The unicast traffic stream 232 can communicate data packets to and from the devices located at the residence 202 via one or more residential gateways 214 associated with the residence 202.

The distribution switch/router system 228 can send data to one or more access switch/router systems 226. The access switch/router system 226 can include or be included within a service area interface 216. In a particular embodiment, the access switch/router system 226 can include a DSLAM. The access switch/router system 226 can receive data from the distribution switch/router system 228 via a broadcast television (BTV) stream 222 and a plurality of unicast subscriber traffic streams 224. The BTV stream 222 can be used to communicate video data packets associated with a multicast stream.

For example, the BTV stream 222 can include a multicast virtual local area network (VLAN) connection between the distribution switch/router system 228 and the access switch/router system 226. Each of the plurality of subscriber traffic streams 224 can be used to communicate subscriber specific data packets. For example, the first subscriber traffic stream can communicate data related to a first subscriber, and the nth subscriber traffic stream can communicate data related to an nth subscriber. Each subscriber to the system 200 can be associated with a respective subscriber traffic stream 224. The subscriber traffic stream 224 can include a subscriber VLAN connection between the distribution switch/router system 228 and the access switch/router system 226 that is associated with a particular set-top box device 204, 206, a particular residence 202, a particular residential gateway 214, another device associated with a subscriber, or any combination thereof.

In an illustrative embodiment, a set-top box device, such as the set-top box device 204, receives a channel change command from an input device, such as a remote control device. The channel change command can indicate selection of an IPTV channel. After receiving the channel change command, the set-top box device 204 generates channel selection data that indicates the selection of the IPTV channel. The set-top box device 204 can send the channel selection data to the access switch/router system 226 via the residential gateway 214. The channel selection data can include an Internet Group Management Protocol (IGMP) Join request. In an illustrative embodiment, the access switch/router system 226 can identify whether it is joined to a multicast group associated with the requested channel based on information in the IGMP Join request.

If the access switch/router system 226 is not joined to the multicast group associated with the requested channel, the access switch/router system 226 can generate a multicast stream request. The multicast stream request can be generated by modifying the received channel selection data. In an illustrative embodiment, the access switch/router system 226 can modify an IGMP Join request to produce a proxy IGMP Join request. The access switch/router system 226 can send the multicast stream request to the distribution switch/router system 228 via the BTV stream 222. In response to receiving the multicast stream request, the distribution switch/router system 228 can send a stream associated with the requested channel to the access switch/router system 226 via the BTV stream 222.

The transcoder 130 of FIG. 1 can be operably coupled to the second communication system 200 for purposes similar to those described above.

Figure 3:
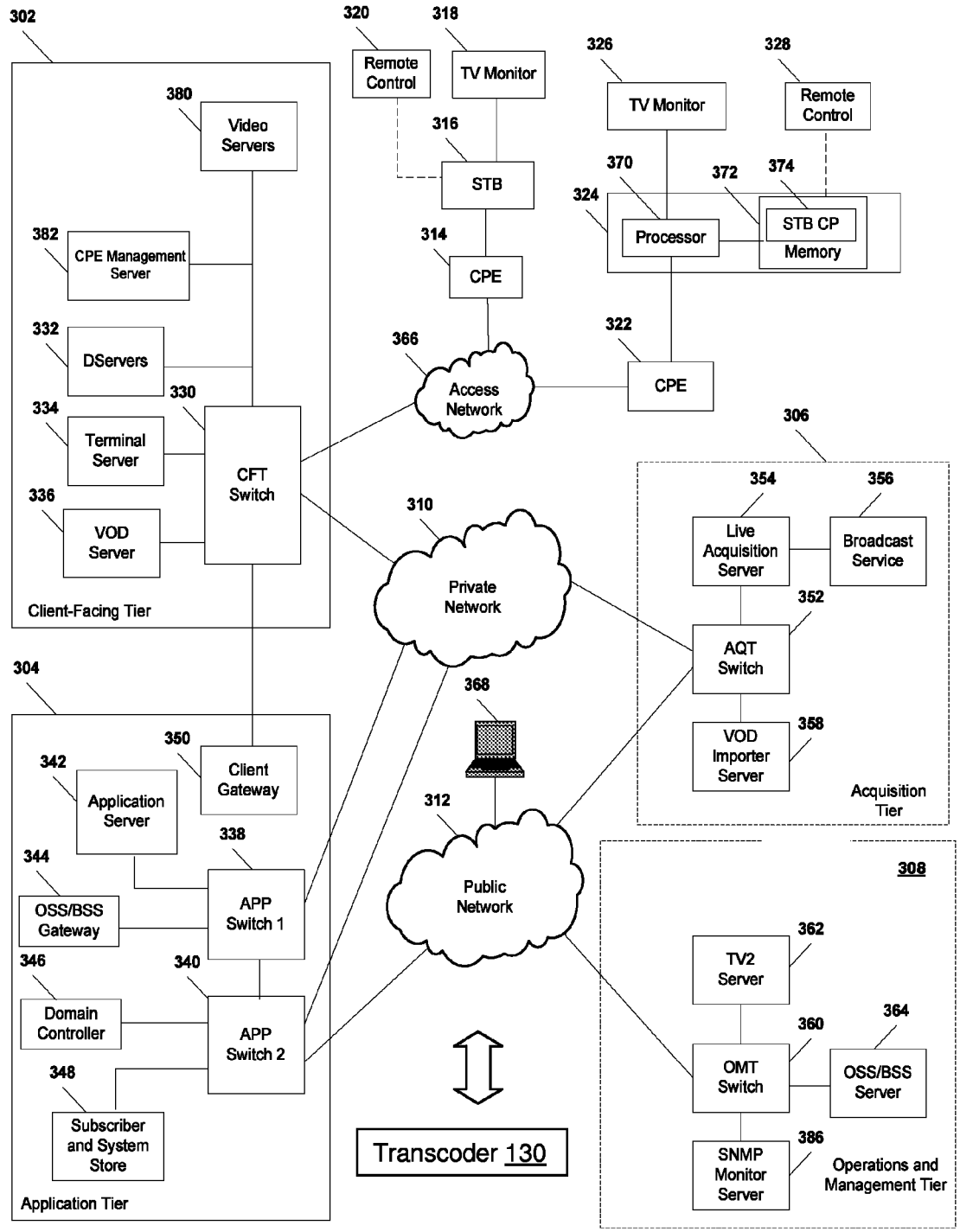

FIG. 3 depicts an illustrative embodiment of a third communication system 300 for delivering media content. Communication system 300 can be overlaid or operably coupled with communication systems 100-200 as another representative embodiment of said communication systems. As shown, the system 300 can include a client facing tier 302, an application tier 304, an acquisition tier 306, and an operations and management tier 308. Each tier 302, 304, 306, 308 is coupled to a private network 310, such as a network of common packet-switched routers and/or switches; to a public network 312, such as the Internet; or to both the private network 310 and the public network 312. For example, the client-facing tier 302 can be coupled to the private network 310. Further, the application tier 304 can be coupled to the private network 310 and to the public network 312. The acquisition tier 306 can also be coupled to the private network 310 and to the public network 312. Additionally, the operations and management tier 308 can be coupled to the public network 312.

As illustrated in FIG. 3, the various tiers 302, 304, 306, 308 communicate with each other via the private network 310 and the public network 312. For instance, the client-facing tier 302 can communicate with the application tier 304 and the acquisition tier 306 via the private network 310. The application tier 304 can communicate with the acquisition tier 306 via the private network 310. Further, the application tier 304 can communicate with the acquisition tier 306 and the operations and management tier 308 via the public network 312. Moreover, the acquisition tier 306 can communicate with the operations and management tier 308 via the public network 312. In a particular embodiment, elements of the application tier 304, including, but not limited to, a client gateway 350, can communicate directly with the client-facing tier 302.

The client-facing tier 302 can communicate with user equipment via an access network 366, such as an IPTV access network. In an illustrative embodiment, customer premises equipment (CPE) 314, 322 can be coupled to a local switch, router, or other device of the access network 366. The client-facing tier 302 can communicate with a first representative set-top box device 316 via the first CPE 314 and with a second representative set-top box device 324 via the second CPE 322. In a particular embodiment, the first representative set-top box device 316 and the first CPE 314 can be located at a first customer premise, and the second representative set-top box device 324 and the second CPE 322 can be located at a second customer premise.

In another particular embodiment, the first representative set-top box device 316 and the second representative set-top box device 324 can be located at a single customer premise, both coupled to one of the CPE 314, 322. The CPE 314, 322 can include routers, local area network devices, modems, such as digital subscriber line (DSL) modems, any other suitable devices for facilitating communication between a set-top box device and the access network 366, or any combination thereof.

In an illustrative embodiment, the client-facing tier 302 can be coupled to the CPE 314, 322 via fiber optic cables. In another illustrative embodiment, the CPE 314, 322 can include DSL modems that are coupled to one or more network nodes via twisted pairs, and the client-facing tier 302 can be coupled to the network nodes via fiber-optic cables. Each set-top box device 316, 324 can process data received via the access network 366, via a common IPTV software platform.

The first set-top box device 316 can be coupled to a first external display device, such as a first television monitor 318, and the second set-top box device 324 can be coupled to a second external display device, such as a second television monitor 326. Moreover, the first set-top box device 316 can communicate with a first remote control 320, and the second set-top box device 324 can communicate with a second remote control 328. The set-top box devices 316, 324 can include IPTV set-top box devices; video gaming devices or consoles that are adapted to receive IPTV content; personal computers or other computing devices that are adapted to emulate set-top box device functionalities; any other device adapted to receive IPTV content and transmit data to an IPTV system via an access network; or any combination thereof.

In an illustrative, non-limiting embodiment, each set-top box device 316, 324 can receive data, video, or any combination thereof, from the client-facing tier 302 via the access network 366 and render or display the data, video, or any combination thereof, at the display device 318, 326 to which it is coupled. In an illustrative embodiment, the set-top box devices 316, 324 can include tuners that receive and decode television programming signals or packet streams for transmission to the display devices 318, 326. Further, the set-top box devices 316, 324 can each include a STB processor 370 and a STB memory device 372 that is accessible to the STB processor 370. In one embodiment, a computer program, such as the STB computer program 374, can be embedded within the STB memory device 372.

In an illustrative embodiment, the client-facing tier 302 can include a client-facing tier (CFT) switch 330 that manages communication between the client-facing tier 302 and the access network 366 and between the client-facing tier 302 and the private network 310. As illustrated, the CFT switch 330 is coupled to one or more distribution servers, such as Distribution-servers (D-servers) 332, that store, format, encode, replicate, or otherwise manipulate or prepare video content for communication from the client-facing tier 302 to the set-top box devices 316, 324. The CFT switch 330 can also be coupled to a terminal server 334 that provides terminal devices with a point of connection to the IPTV system 300 via the client-facing tier 302.

In a particular embodiment, the CFT switch 330 can be coupled to a VoD server 336 that stores or provides VoD content imported by the IPTV system 300. Further, the CFT switch 330 is coupled to one or more video servers 380 that receive video content and transmit the content to the set-top boxes 316, 324 via the access network 366. The client-facing tier 302 may include a CPE management server 382 that manages communications to and from the CPE 314 and the CPE 322. For example, the CPE management server 382 may collect performance data associated with the set-top box devices 316, 324 from the CPE 314 or the CPE 322 and forward the collected performance data to a server associated with the operations and management tier 308.

In an illustrative embodiment, the client-facing tier 302 can communicate with a large number of set-top boxes, such as the representative set-top boxes 316, 324, over a wide geographic area, such as a metropolitan area, a viewing area, a statewide area, a regional area, a nationwide area or any other suitable geographic area, market area, or subscriber or customer group that can be supported by networking the client-facing tier 302 to numerous set-top box devices. In a particular embodiment, the CFT switch 330, or any portion thereof, can include a multicast router or switch that communicates with multiple set-top box devices via a multicast-enabled network.

As illustrated in FIG. 3, the application tier 304 can communicate with both the private network 310 and the public network 312. The application tier 304 can include a first application tier (APP) switch 338 and a second APP switch 340. In a particular embodiment, the first APP switch 338 can be coupled to the second APP switch 340. The first APP switch 338 can be coupled to an application server 342 and to an OSS/BSS gateway 344. In a particular embodiment, the application server 342 can provide applications to the set-top box devices 316, 324 via the access network 366, which enable the set-top box devices 316, 324 to provide functions, such as interactive program guides, video gaming, display, messaging, processing of VoD material and other IPTV content, etc. In an illustrative embodiment, the application server 342 can provide location information to the set-top box devices 316, 324. In a particular embodiment, the OSS/BSS gateway 344 includes operation systems and support (OSS) data, as well as billing systems and support (BSS) data. In one embodiment, the OSS/BSS gateway 344 can provide or restrict access to an OSS/BSS server 364 that stores operations and billing systems data.

The second APP switch 340 can be coupled to a domain controller 346 that provides Internet access, for example, to users at their computers 368 via the public network 312. For example, the domain controller 346 can provide remote Internet access to IPTV account information, e-mail, personalized Internet services, or other online services via the public network 312. In addition, the second APP switch 340 can be coupled to a subscriber and system store 348 that includes account information, such as account information that is associated with users who access the IPTV system 300 via the private network 310 or the public network 312. In an illustrative embodiment, the subscriber and system store 348 can store subscriber or customer data and create subscriber or customer profiles that are associated with IP addresses, stock-keeping unit (SKU) numbers, other identifiers, or any combination thereof, of corresponding set-top box devices 316, 324. In another illustrative embodiment, the subscriber and system store can store data associated with capabilities of set-top box devices associated with particular customers.

In a particular embodiment, the application tier 304 can include a client gateway 350 that communicates data directly to the client-facing tier 302. In this embodiment, the client gateway 350 can be coupled directly to the CFT switch 330. The client gateway 350 can provide user access to the private network 310 and the tiers coupled thereto. In an illustrative embodiment, the set-top box devices 316, 324 can access the IPTV system 300 via the access network 366, using information received from the client gateway 350. User devices can access the client gateway 350 via the access network 366, and the client gateway 350 can allow such devices to access the private network 310 once the devices are authenticated or verified. Similarly, the client gateway 350 can prevent unauthorized devices, such as hacker computers or stolen set-top box devices from accessing the private network 310, by denying access to these devices beyond the access network 366.

For example, when the first representative set-top box device 316 accesses the client-facing tier 302 via the access network 366, the client gateway 350 can verify subscriber information by communicating with the subscriber and system store 348 via the private network 310. Further, the client gateway 350 can verify billing information and status by communicating with the OSS/BSS gateway 344 via the private network 310. In one embodiment, the OSS/BSS gateway 344 can transmit a query via the public network 312 to the OSS/BSS server 364. After the client gateway 350 confirms subscriber and/or billing information, the client gateway 350 can allow the set-top box device 316 to access IPTV content and VoD content at the client-facing tier 302. If the client gateway 350 cannot verify subscriber information for the set-top box device 316, e.g., because it is connected to an unauthorized twisted pair, the client gateway 350 can block transmissions to and from the set-top box device 316 beyond the access network 366.

As indicated in FIG. 3, the acquisition tier 306 includes an acquisition tier (AQT) switch 352 that communicates with the private network 310. The AQT switch 352 can also communicate with the operations and management tier 308 via the public network 312. In a particular embodiment, the AQT switch 352 can be coupled to one or more live Acquisition-servers (A-servers) 354 that receive or acquire television content, movie content, advertisement content, other video content, or any combination thereof, from a broadcast service 356, such as a satellite acquisition system or satellite head-end office. In a particular embodiment, the live acquisition server 354 can transmit content to the AQT switch 352, and the AQT switch 352 can transmit the content to the CFT switch 330 via the private network 310.

In an illustrative embodiment, content can be transmitted to the D-servers 332, where it can be encoded, formatted, stored, replicated, or otherwise manipulated and prepared for communication from the video server(s) 380 to the set-top box devices 316, 324. The CFT switch 330 can receive content from the video server(s) 380 and communicate the content to the CPE 314, 322 via the access network 366. The set-top box devices 316, 324 can receive the content via the CPE 314, 322, and can transmit the content to the television monitors 318, 326. In an illustrative embodiment, video or audio portions of the content can be streamed to the set-top box devices 316, 324.

Further, the AQT switch 352 can be coupled to a video-on-demand importer server 358 that receives and stores television or movie content received at the acquisition tier 306 and communicates the stored content to the VoD server 336 at the client-facing tier 302 via the private network 310. Additionally, at the acquisition tier 306, the VoD importer server 358 can receive content from one or more VoD sources outside the IPTV system 300, such as movie studios and programmers of non-live content. The VoD importer server 358 can transmit the VoD content to the AQT switch 352, and the AQT switch 352, in turn, can communicate the material to the CFT switch 330 via the private network 310. The VoD content can be stored at one or more servers, such as the VoD server 336.

When users issue requests for VoD content via the set-top box devices 316, 324, the requests can be transmitted over the access network 366 to the VoD server 336, via the CFT switch 330. Upon receiving such requests, the VoD server 336 can retrieve the requested VoD content and transmit the content to the set-top box devices 316, 324 across the access network 366, via the CFT switch 330. The set-top box devices 316, 324 can transmit the VoD content to the television monitors 318, 326. In an illustrative embodiment, video or audio portions of VoD content can be streamed to the set-top box devices 316, 324.

FIG. 3 further illustrates that the operations and management tier 308 can include an operations and management tier (OMT) switch 360 that conducts communication between the operations and management tier 308 and the public network 312. In the embodiment illustrated by FIG. 3, the OMT switch 360 is coupled to a TV2 server 362. Additionally, the OMT switch 360 can be coupled to an OSS/BSS server 364 and to a simple network management protocol monitor 386 that monitors network devices within or coupled to the IPTV system 300. In a particular embodiment, the OMT switch 360 can communicate with the AQT switch 352 via the public network 312.

The OSS/BSS server 364 may include a cluster of servers, such as one or more CPE data collection servers that are adapted to request and store operations systems data, such as performance data from the set-top box devices 316, 324. In an illustrative embodiment, the CPE data collection servers may be adapted to analyze performance data to identify a condition of a physical component of a network path associated with a set-top box device, to predict a condition of a physical component of a network path associated with a set-top box device, or any combination thereof.

In an illustrative embodiment, the live acquisition server 354 can transmit content to the AQT switch 352, and the AQT switch 352, in turn, can transmit the content to the OMT switch 360 via the public network 312. In this embodiment, the OMT switch 360 can transmit the content to the TV2 server 362 for display to users accessing the user interface at the TV2 server 362. For example, a user can access the TV2 server 362 using a personal computer 368 coupled to the public network 312.

The transcoder 130 of FIG. 1 can be operably coupled to the third communication system 300 for purposes similar to those described above.

It should be apparent to one of ordinary skill in the art from the foregoing media communication system embodiments that other suitable media communication systems for distributing broadcast media content as well as peer-to-peer exchange of content can be applied to the present disclosure.

Figure 4:
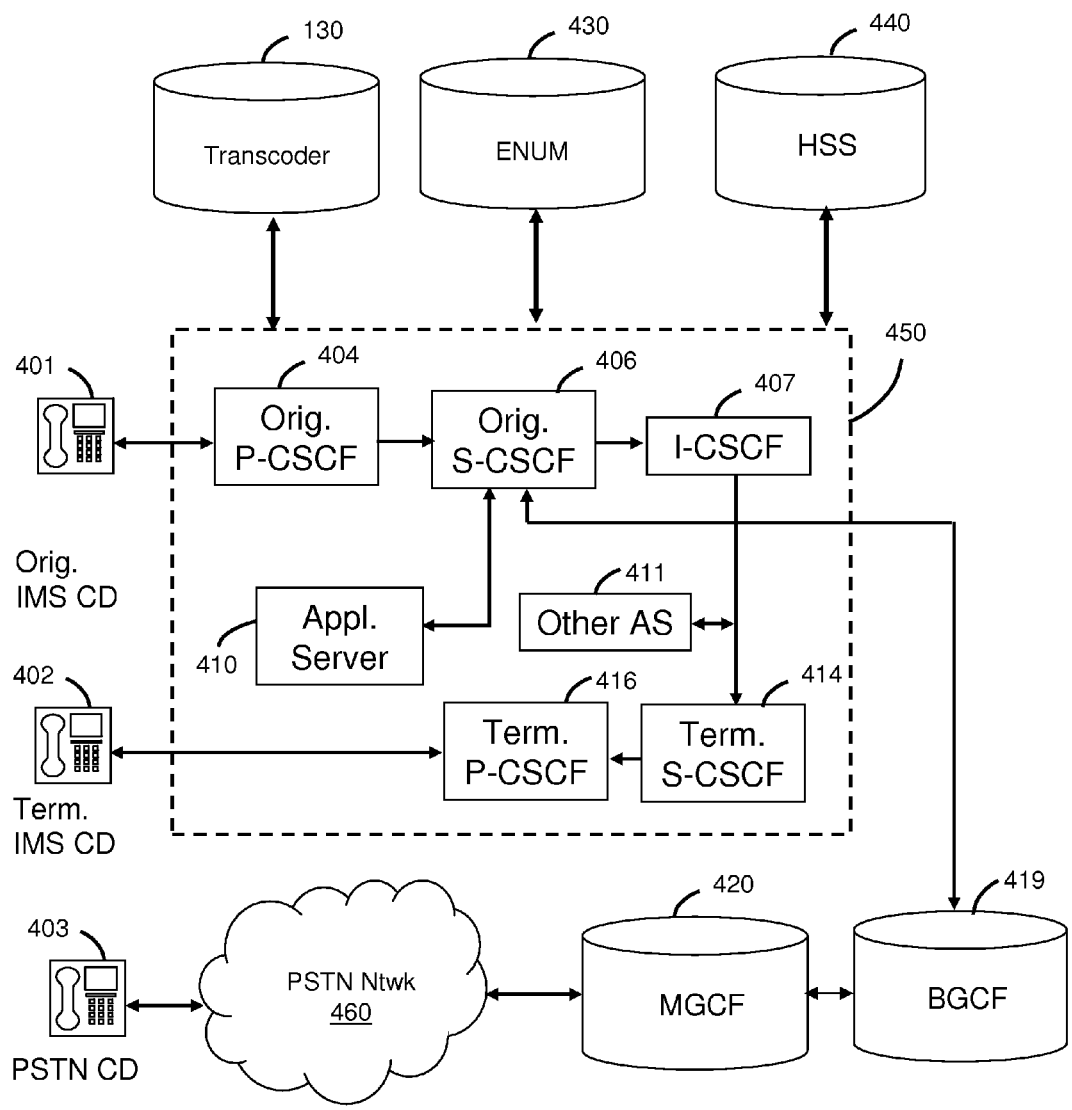

FIG. 4 depicts an illustrative embodiment of a communication system 400 employing an IP Multimedia Subsystem (IMS) network architecture. Communication system 400 can be overlaid or operably coupled with communication systems 100-300 as another representative embodiment of said communication systems.

The communication system 400 can comprise a Home Subscriber Server (HSS) 440, a tElephone NUmber Mapping (ENUM) server 430, and network elements of an IMS network 450. The IMS network 450 can be coupled to IMS compliant communication devices (CD) 401, 402 or a Public Switched Telephone Network (PSTN) CD 403 using a Media Gateway Control Function (MGCF) 420 that connects the call through a common PSTN network 460.

IMS CDs 401, 402 register with the IMS network 450 by contacting a Proxy Call Session Control Function (P-CSCF) which communicates with a corresponding Serving CSCF (S-CSCF) to register the CDs with an Authentication, Authorization and Accounting (AAA) supported by the HSS 440. To accomplish a communication session between CDs, an originating IMS CD 401 can submit a Session Initiation Protocol (SIP INVITE) message to an originating P-CSCF 404 which communicates with a corresponding originating S-CSCF 406. The originating S-CSCF 406 can submit the SIP INVITE message to an application server (AS) such as reference 410 that can provide a variety of services to IMS subscribers. For example, the application server 410 can be used to perform originating treatment functions on the calling party number received by the originating S-CSCF 406 in the SIP INVITE message.

Originating treatment functions can include determining whether the calling party number has international calling services, and/or is requesting special telephony features (e.g., *72 forward calls, *73 cancel call forwarding, *67 for caller ID blocking, and so on). Additionally, the originating S-CSCF 406 can submit queries to the ENUM system 430 to translate an E.164 telephone number to a SIP Uniform Resource Identifier (URI) if the targeted communication device is IMS compliant. If the targeted communication device is a PSTN device, the ENUM system 430 will respond with an unsuccessful address resolution and the S-CSCF 406 will forward the call to the MGCF 420 via a Breakout Gateway Control Function (BGCF) 419.

When the ENUM server 430 returns a SIP URI, the SIP URI is used by an Interrogating CSCF (I-CSCF) 407 to submit a query to the HSS 440 to identify a terminating S-CSCF 414 associated with a terminating IMS CD such as reference 402. Once identified, the I-CSCF 407 can submit the SIP INVITE to the terminating S-CSCF 414 which can call on an application server 411 similar to reference 410 to perform the originating treatment telephony functions described earlier. The terminating S-CSCF 414 can then identify a terminating P-CSCF 416 associated with the terminating CD 402. The P-CSCF 416 then signals the CD 402 to establish communications. The aforementioned process is symmetrical. Accordingly, the terms "originating" and "terminating" in FIG. 4 can be interchanged.

IMS network 450 can also be operably coupled to the transcoder 130 previously discussed for FIG. 1. In this representative embodiment, the transcoder 130 can be accessed over a PSTN or VoIP channel of communication system 400 by common techniques such as described above.

Figure 5:
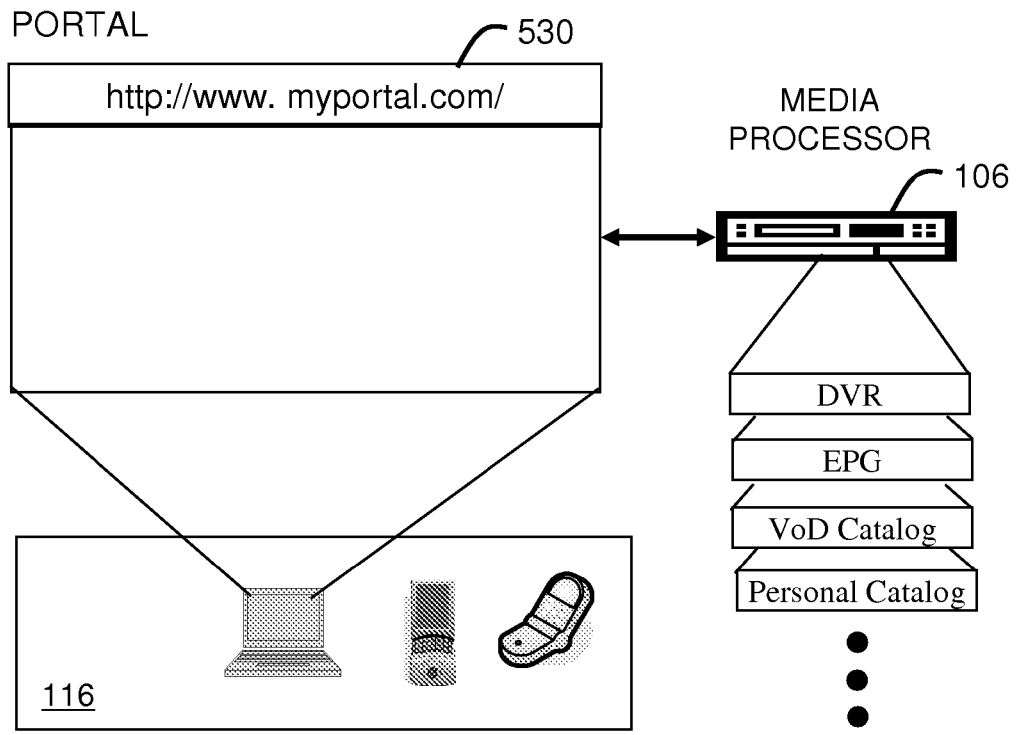
FIG. 5 depicts an illustrative embodiment of a portal interacting with at least one among the communication systems of FIGS. 1-4.

FIG. 5 depicts an illustrative embodiment of a portal 530. The portal 530 can be used for managing services of communication systems 100-400. The portal 530 can be accessed by a Uniform Resource Locator (URL) with a common Internet browser such as Microsoft's Internet Explorer using an Internet-capable communication device such as references 108, 116, or 210 of FIGS. 1-2. The portal 530 can be configured to access a media processor such as references 106, 204, 206, 316, and 324 of FIGS. 1-3 and services managed thereby such as a Digital Video Recorder (DVR), an Electronic Programming Guide (EPG), VoD catalog, a personal catalog stored in the STB (e.g., personal videos, pictures, audio recordings, etc.), and so on.

Figure 6:
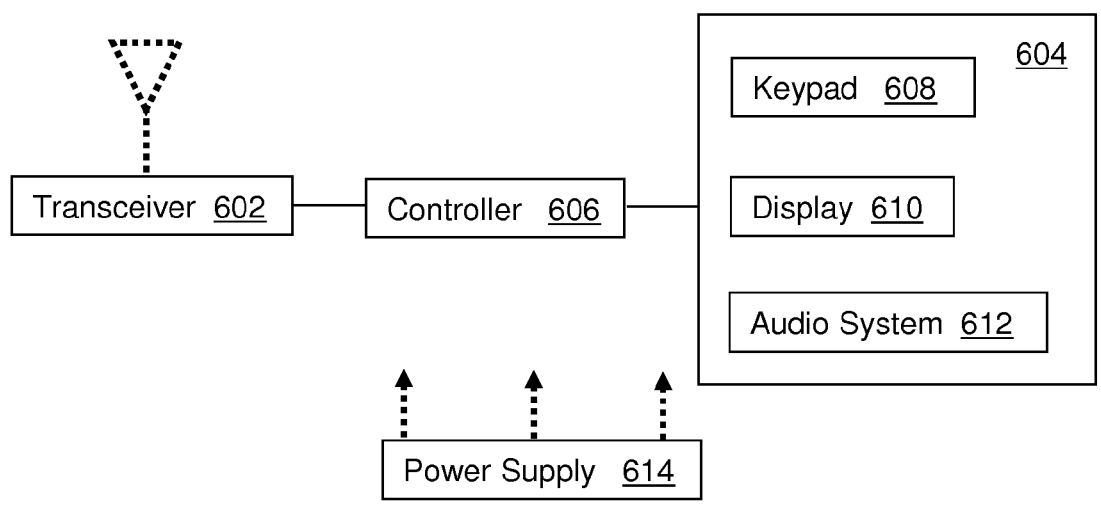
FIG. 6 depicts an illustrative embodiment of a communication device utilized in the communication systems of FIGS. 1-4.

FIG. 6 depicts an exemplary embodiment of a communication device 600. Communication device 600 can be a representative portion of any of the aforementioned communication devices of FIGS. 1-4. The communication device 604 can comprise a wireline and/or wireless transceiver 602 (herein transceiver 602), a user interface (UI) 604, a power supply 614, and a controller 606 for managing operations thereof. The transceiver 602 can support short-range or long-range wireless access technologies such as a Bluetooth wireless access protocol, a Wireless Fidelity (WiFi) access protocol, a Digital Enhanced Cordless Telecommunications (DECT) wireless access protocol, cellular, software defined radio (SDR) and/or WiMAX technologies, just to mention a few. Cellular technologies can include, for example, CDMA-1XRTT, CDMA2000 EV-DO, UMTS/HSDPA, GSM/GPRS, TDMA/EDGE, EV/DO, and next generation technologies as they arise.

The transceiver 602 can also support common wireline access technologies such as circuit-switched wireline access technologies, packet-switched wireline access technologies, or combinations thereof. PSTN can represent one of the common circuit-switched wireline access technologies. Voice over Internet Protocol (VoIP), and IP data communications can represent some of the commonly available packet-switched wireline access technologies. The transceiver 602 can also be adapted to support IP Multimedia Subsystem (IMS) protocol for interfacing to an IMS network that can combine PSTN and VoIP communication technologies.

The UI 604 can include a depressible or touch-sensitive keypad 608 and a navigation mechanism such as a roller ball, joystick, mouse, and/or navigation disk for manipulating operations of the communication device 600. The keypad 608 can be an integral part of a housing assembly of the communication device 600 or an independent device operably coupled thereto by a tethered wiring interface (e.g., USB) or a wireless interface supporting for example Bluetooth. The keypad 608 can represent a numeric dialing keypad commonly used by phones, and/or a Qwerty keypad with alphanumeric keys.

The UI 604 can further include a display 610 such as monochrome or color LCD (Liquid Crystal Display), OLED (Organic Light Emitting Diode) or other suitable display technology for conveying images to the end user of the communication device 600. In an embodiment where the display 610 is touch-sensitive, a portion or all of the keypad 608 can be presented by way of the display. The UI 604 can also include an audio system 612 that utilizes common audio technology for conveying low volume audio (e.g., audio heard only in the proximity of a human ear) and high volume audio (e.g., speakerphone for hands free operation). The audio system 612 can further include a microphone for receiving audible signals of an end user.

The power supply 614 can utilize common power management technologies such as replaceable and rechargeable batteries, supply regulation technologies, and charging system technologies for supplying energy to the components of the communication device 600 to facilitate long-range or short-range portable applications. The controller 606 can utilize computing technologies such as a microprocessor and/or digital signal processor (DSP) with associated storage memory such a Flash, ROM, RAM, SRAM, DRAM or other storage technologies.

Figure 7:
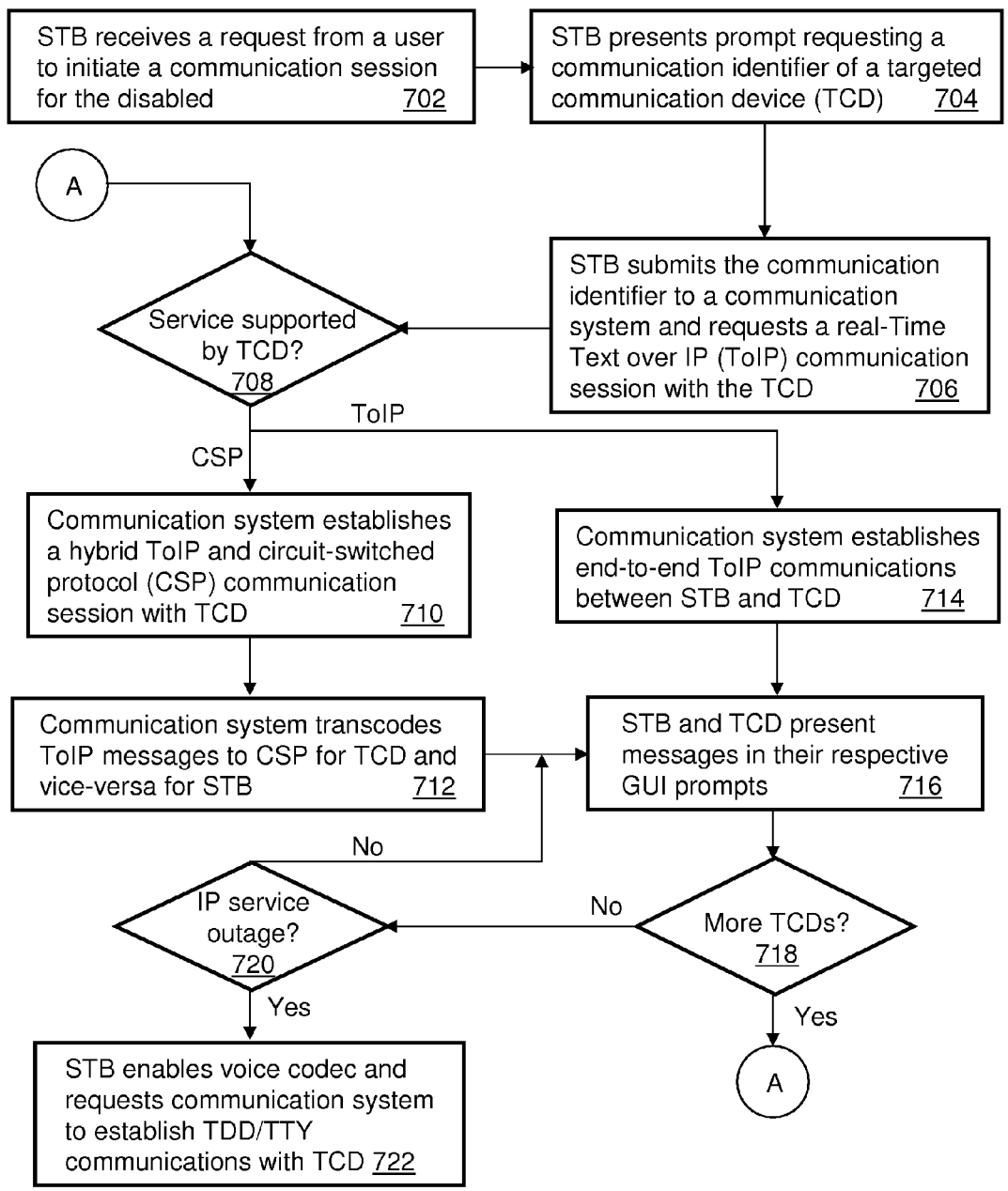
FIG. 7 depicts an illustrative embodiment of a method operating in portions of the communication systems of FIGS. 1-4.
Figure 8:
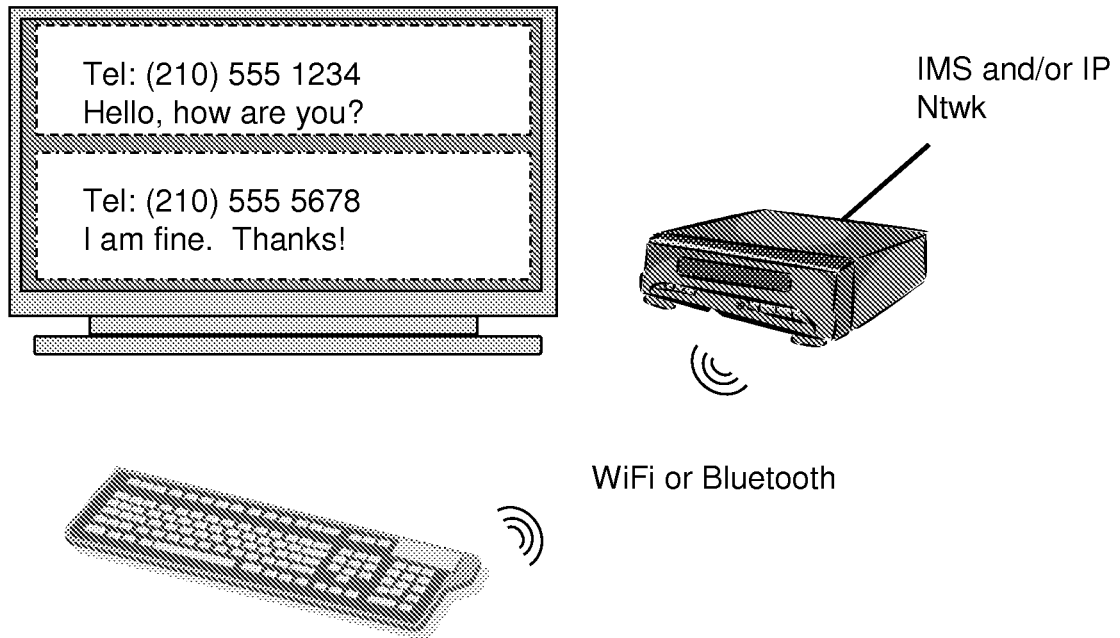
FIG. 8 depicts an illustrative embodiment of the method of FIG. 7.

FIG. 7 depicts an illustrative method 700 operating in portions of communication systems 100-400. FIG. 8 depicts an illustrative embodiment of the method 700. Method 700 can begin with step 702 in which an STB (such as described above) receives a request from a user to initiate a communication session for the disabled such as, for example, for individuals who have poor hearing (e.g., deaf), and/or cannot speak (e.g., mute or disabled in speech due to paralysis or other ailment). The person initiating the request may or may not have a disability, and/or may want to communicate with someone that does. Step 702 can be initiated by selecting for example a specialized button on a remote controller 107 of the STB or a keypad 608 (tethered or wireless with Bluetooth) for engaging in messaging for the deaf or mute via the STB.

In response to step 704, the STB can present the user a prompt requesting a communication identifier of a targeted communication device (TCD). The communication identifier can be, for example, an E.164 number or SIP URI. The TCD can be selected from an address book stored by the STB or entered manually via the keypad 608. In step 706, the STB can submit the communication identifier to one of the communication systems 100-400 of FIGS. 1-4, or combinations thereof. Suppose for instance the communication identifier is transmitted to the IMS network 450 of FIG. 4 with a request to engage in a ToIP communication session. In step 708 the ENUM 430 can determine whether the TCD is ToIP-compatible or a common circuit-switched protocol (CSP) terminal such as a Teletypewriter (TTY) operating as a Telecommunication Device for the Deaf (TDD). This determination can be made from a pre-existing entry in the ENUM 430 provisioned by the HSS 440 during registration of the TCD. The entry can indicate the communication protocol capability of the TCD. Alternatively, the HSS 440 can notify network elements of the IMS network 450 (such as the I-CSCF 407) the mode of operations of the TCD.

If in step 708, it is determined the TCD is CSP compatible, the IMS network 450 can utilize the transcoder 130 to enable communications between disparate communications devices (i.e., ToIP-STB and CSP-TCD). In this illustration, the transcoder 130 can correspond to an IMS application server that has been programmed by common means to transcode ToIP messages to CSP messages and vice-versa. With this in mind, the IMS network 450 establishes in step 710 a communication session between the STB and the TCD as previously described in FIG. 4. Once a hybrid ToIP-CSP communication session has been established in step 710, the transcoder 130 can transcode ToIP messages initiated by the STB to CSP messages directed to the TCD, and transcode CSP messages initiated by the TCD to ToIP messages directed to the STB. If on the other hand it is determined in step 708 that the TCD is ToIP-capable, then the IMS network 450 in step 714 can establish an end-to-end ToIP communication session between the STB and the TCD.

During the communication session, each of the STB and TCD present message exchanges in their respective GUI prompts as shown in FIG. 8. In the case of the STB, the GUI prompt can be presented in a media presentation device 108 such as a high definition TV.

In step 718, the IMS network 450 can also be directed to monitor requests from the STB or the TCD for additional TCDs to be added to the communication session established in steps 710 or 714, thereby establishing a conference session. If a request with a communication identifier of another TCD is received from either the STB or the active TCD, the IMS network 450 can be programmed to process the request as previously described in steps 708-716. Accordingly, if the additional TCD is determined to be incompatible with one of the STB and TCD, the IMS network 450 can establish a conference session that joins all the STB and the two TCDs and directs the transcoder 130 to resolve messaging protocol disparities as described above.

As a safeguard, the STB can be configured with a voice coder/decoder (codec) to operate as a traditional TTY/TDD terminal. If in step 720, the STB detects that the IMS network 450 has an IP service outage thereby preventing it from establishing a ToIP communication session, but traditional CSP communication resources are still available, the STB can proceed to step 722 and establish (or re-establish) communications by way of a TDD/TTY protocol (utilizing DTMF tones for character recognition) to communicate with a TCD terminal also supporting the TDD/TTY protocol.

Upon reviewing the aforementioned embodiments, it would be evident to an artisan with ordinary skill in the art that said embodiments can be modified, reduced, or enhanced without departing from the scope and spirit of the claims described below. For example, method 700 can be adapted for any of the IPTV, cable TV or satellite TV communication systems 100-300. Accordingly, these communication systems can be programmed to support ToIP and CSP communications, and transcode messages by way of the transcoder 130 when incompatibilities are detected. Additionally, method 700 can be adapted so that combinations of communications systems 100-400 cooperatively establish hybrid ToIP to CSP, ToIP to ToIP, or CSP to CSP communication sessions.

In yet another embodiment, method 700 can be adapted so that an initiating device such as an STB with a built-in voice coder can determine whether the targeted communication device operates according to ToIP or CSP. If CSP is detected, the STB can engage in a PSTN communication session using a TDD/TTY protocol such as defined by ITU-T V.18. Otherwise, the STB can engage in a ToIP communication session over a packet switched network such as described above. In this embodiment, a network transcoder is not necessary. In yet another embodiment, method 700 can be adapted so that in step 708 if a determination is made that ToIP is not possible with the TCD, and transcoding is not available, then the communication system can alternatively establish a communication session using ITU-T V.18 for TDD/TTY terminals over traditional VoIP using non-compressed codecs such as G.711.

Other suitable modifications can be applied to the present disclosure without departing from the scope of the claims below. Accordingly, the reader is directed to the claims section for a fuller understanding of the breadth and scope of the present disclosure.

Figure 9:
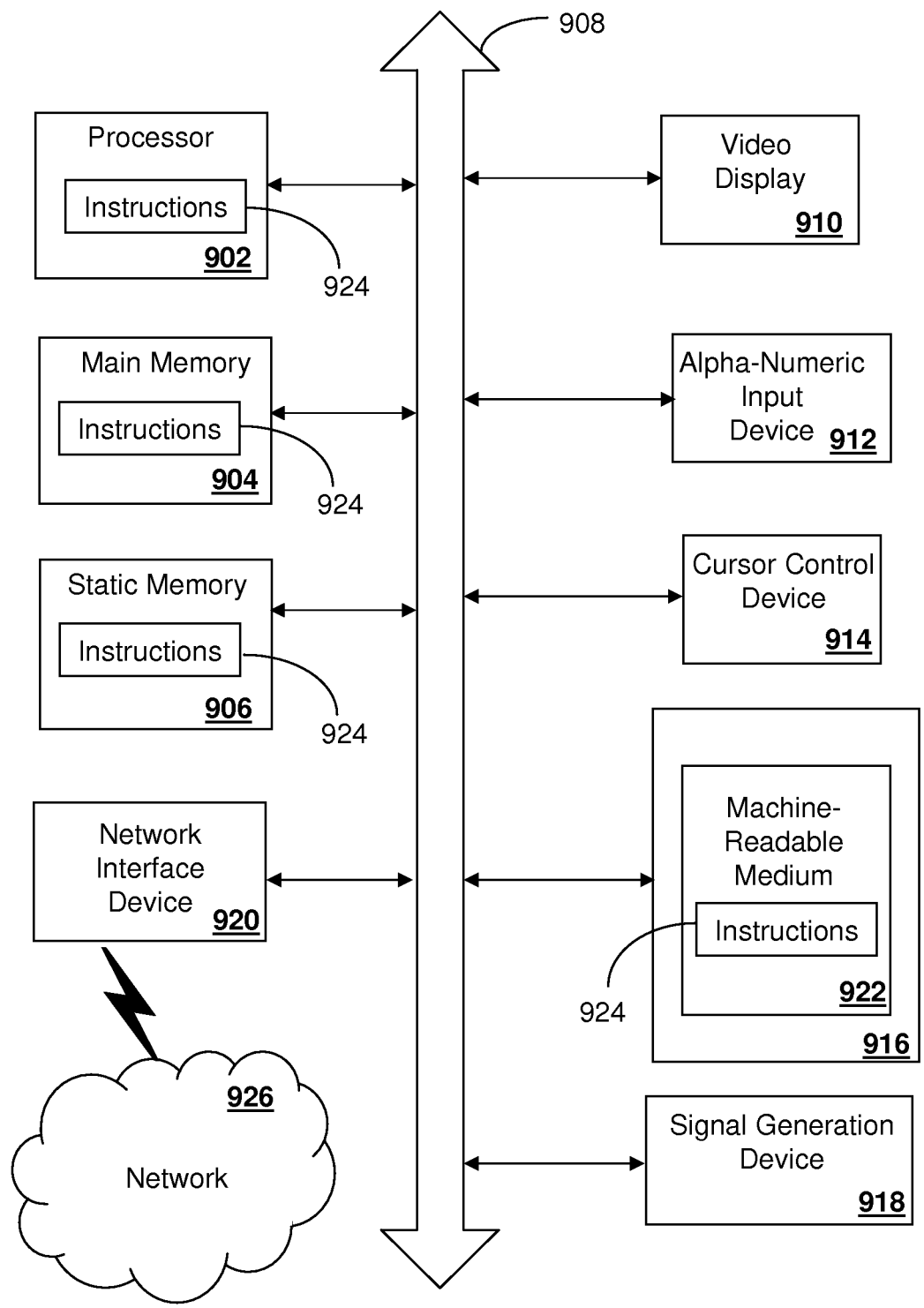
FIG. 9 is a diagrammatic representation of a machine in the form of a computer system within which a set of instructions, when executed, may cause the machine to perform any one or more of the methodologies discussed herein.

FIG. 9 depicts an exemplary diagrammatic representation of a machine in the form of a computer system 900 within which a set of instructions, when executed, may cause the machine to perform any one or more of the methodologies discussed above. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. It will be understood that a device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 900 may include a processor 902 (e.g., a central processing unit (CPU), a graphics processing unit (GPU), or both), a main memory 904 and a static memory 906, which communicate with each other via a bus 908. The computer system 900 may further include a video display unit 910 (e.g., a liquid crystal display (LCD), a flat panel, a solid state display, or a cathode ray tube (CRT)). The computer system 900 may include an input device 912 (e.g., a keyboard), a cursor control device 914 (e.g., a mouse), a disk drive unit 916, a signal generation device 918 (e.g., a speaker or remote control) and a network interface device 920.

The disk drive unit 916 may include a machine-readable medium 922 on which is stored one or more sets of instructions (e.g., software 924) embodying any one or more of the methodologies or functions described herein, including those methods illustrated above. The instructions 924 may also reside, completely or at least partially, within the main memory 904, the static memory 906, and/or within the processor 902 during execution thereof by the computer system 900. The main memory 904 and the processor 902 also may constitute machine-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine readable medium containing instructions 924, or that which receives and executes instructions 924 from a propagated signal so that a device connected to a network environment 926 can send or receive voice, video or data, and to communicate over the network 926 using the instructions 924. The instructions 924 may further be transmitted or received over a network 926 via the network interface device 920.

While the machine-readable medium 922 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure.

The term "machine-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and carrier wave signals such as a signal embodying computer instructions in a transmission medium; and/or a digital file attachment to e-mail or other self-contained information archive or set of archives is considered a distribution medium equivalent to a tangible storage medium. Accordingly, the disclosure is considered to include any one or more of a machine-readable medium or a distribution medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. An internet protocol multimedia subsystem communication system, comprising:
    a memory to computer instructions; and
    a processor coupled to the memory, wherein the processor, responsive to executing the computer instructions, performs operations comprising:
        receiving from a set top box a communication identifier of a first targeted communication device to conduct a communication session utilizing a real-time text over internet protocol;
        submitting a request comprising the communication identifier of the first targeted communication device to a telephone number mapping server to determine whether the first targeted communication device operates according to one of a circuit-switched protocol or the real-time text over internet protocol, wherein the telephone number mapping server comprises a pre-existing entry indicating that the targeted communication device operates according to the circuit-switched protocol or the real-time text over internet protocol, and wherein the pre-existing entry is provisioned at the telephone number mapping server during registration of the first targeted communication device;
        responsive to detecting that the first targeted communication device operates according to the circuit-switched protocol,
            facilitating establishment of the communication session between the set top box and the first targeted communication device, wherein the communication session operates in part as a text over internet protocol communication session and operates in part as a circuit-switched communication session, wherein the set top box exchanges messages with the first targeted communication device utilizing the text over internet protocol communication session, and wherein the first targeted communication device exchanges messages with the set top box utilizing the circuit-switched communication session;
            transcoding text over internet protocol communications initiated by the set top box to circuit-switched protocol communications for use by the first targeted communication device;
            transcoding circuit-switched protocol communications initiated by the first targeted communication device to text over internet protocol communications for use by the set top box; and
        responsive to detecting that the first targeted communication device operates according to the text over internet protocol, facilitating establishment of the communication session between the set top box and the first targeted communication device according to the text over internet protocol.

2. The internet protocol multimedia subsystem communication system of claim 1, wherein the set top box operates in one of an internet protocol television system, a cable television system, or a satellite television system.

3. The internet protocol multimedia subsystem communication system of claim 1, wherein the first targeted communication device corresponds to a telecommunications device used by a user who is deaf.

4. The internet protocol multimedia subsystem communication system of claim 3, wherein the telecommunications device used by the user who is deaf operates in a public switched telephone network.

5. The internet protocol multimedia subsystem communication system of claim 1, wherein text over internet protocol communications utilize a session initiation protocol.

6. The internet protocol multimedia subsystem communication system of claim 1, wherein the communication identifier corresponds to one of an E.164 number or a session initiation protocol uniform resource identifier.

7. The internet protocol multimedia subsystem communication system of claim 1, wherein the processor, responsive to executing the computer instructions, performs operations comprising:
  receiving from the set top box a second communication identifier of a second targeted communication device; and
  determining whether the second targeted communication device operates according to one of the circuit-switched protocol or the text over internet protocol.

8. The internet protocol multimedia subsystem communication system of claim 7, wherein the processor, responsive to executing the computer instructions, performs operations comprising:
  responsive to detecting that the second targeted communication device operates according to the circuit-switched protocol:
    joining the second targeted communication device in the communication session between the set top box and the first targeted communication device,
    transcoding for the second targeted communication device the text over internet protocol communications initiated by the set top box to the circuit-switched protocol communications,
    transcoding for the second targeted communication device the text over internet protocol communications initiated by the first targeted communication device to circuit-switched protocol communications when the first targeted communication device is determined to operate according to the text over internet protocol,
    transcoding for the set top box circuit-switched protocol communications initiated by the second targeted communication device to the text over internet protocol communications, and
    transcoding for the first targeted communication device circuit-switched protocol communications initiated by the second targeted communication device to the text over internet protocol communications when the first targeted communication device is determined to operate according to text over internet protocol.

9. The internet protocol multimedia subsystem communication system of claim 7, wherein the processor, responsive to executing the computer instructions, performs operations comprising:
  responsive to detecting that the second targeted communication device operates according to the text over internet protocol and the first communication device operates according to circuit-switched protocol communications:
    joining the second targeted communication device in the communication session between the set top box and the first targeted communication device,
    transcoding for the first targeted communication device the text over internet protocol communications initiated by the second communication device or the set top box to circuit-switched protocol communications, and
    transcoding for the second targeted communication device and the set top box circuit-switched protocol communications initiated by the first targeted communication device to the text over internet protocol communications.

10. The internet protocol multimedia subsystem communication system of claim 1, wherein the first targeted communication device corresponds to a second set top box operating according to the text over internet protocol or the circuit-switched protocol.

11. A communication system, comprising:
  a memory to store computer instructions; and
  a processor coupled to the memory, wherein the processor, responsive to executing the computer instructions, performs operations comprising:
    receiving from a first communication device a communication identifier of a second communication device to conduct a communication session utilizing a real-time text over internet protocol;
    submitting a request comprising the communication identifier of the second communication device to a telephone number mapping server to determine whether the second communication device operates according to one of a circuit-switched protocol or text over internet protocol, wherein the telephone number mapping server comprises a pre-existing entry indicating that the second communication device operates according to the circuit-switched protocol or the real-time text over internet protocol, and wherein the pre-existing entry is provisioned at the telephone number mapping server during registration of the second communication device;
    responsive to detecting that the second communication device operates according to the circuit-switched protocol and detecting that transcoding from text over internet protocol communications to circuit-switched protocol communications and from circuit-switched protocol communications to text over internet protocol communications is an available resource to enable communications between disparate communication devices:
      facilitating establishment of the communication session between the first and second communication devices,
      transcoding text over internet protocol communications initiated by the first communication device to circuit-switched protocol communications for use by the second communication device, and
      transcoding circuit-switched protocol communications initiated by the second communication device to text over internet protocol communications for use by the first communication device; and
    responsive to detecting that the second communication device operates according to the text over internet protocol, facilitating establishment of the communication session between the first and second communication devices according to the text over internet protocol.

12. The communication system of claim 11, wherein the communication system operates according to one of an internet protocol multimedia subsystem communication network, an internet protocol television communication network, a cable television communication network, or a satellite television communication network, and wherein the processor, responsive to executing the computer instructions, performs operations comprising facilitating establishment of a voice over internet protocol communication session supportive of telecommunications devices used by a person who is deaf responsive to detecting that the second communication device operates according to circuit-switched protocol and determining that transcoding is not an available resource.

13. The communication system of claim 11, wherein the first or second communication devices correspond to one of a set-top box, a cellular phone, a computer terminal, or a telecommunications devices used by a person who is deaf.

14. The communication system of claim 13, wherein the telecommunications devices for the deaf operates in a public switched telephone network.

15. The communication system of claim 11, wherein text over internet protocol communications utilize a session initiation protocol.

16. The communication system of claim 11, wherein the communication identifier corresponds to one of an E.164 number or a session initiation protocol uniform resource identifier.

17. The communication system of claim 11, wherein the processor, responsive to executing the computer instructions, performs operations comprising:
   receiving from one of the first or second communication devices a second communication identifier of a third communication device; and
   submitting a second request comprising the second communication identifier of the third communication device to a telephone number mapping server to determine whether the third communication device operates according to one of the circuit-switched protocol or the text over internet protocol.

18. The communication system of claim 17, wherein the processor, responsive to executing the computer instructions, performs operations comprising:
   responsive to detecting that the third communication device operates according to the circuit-switched protocol,
   joining the third communication device in the communication session between the first and second communication devices,
   transcoding text over internet protocol communications initiated by the first communication device to circuit-switched protocol communications for use by the third communication device,
   transcoding text over internet protocol communications initiated by the second communication device to circuit-switched protocol communications when the second communication device is determined to operate according to text over internet protocol for use by the third communication device,
   transcoding circuit-switched protocol communications initiated by the third communication device to text over internet protocol communications for use by the first communication device, and
   transcoding circuit-switched protocol communications initiated by the third communication device to text over internet protocol communications when the second communication device is determined to operate according to text over internet protocol for use by the second communication device.

19. The communication system of claim 17, wherein the operations further comprise:
   responsive to detecting that the third communication device operates according to text over internet protocol and the second communication device operates according to circuit-switched protocol,
   joining the third communication device in the communication session between the first and second communication devices,
   transcoding text over internet protocol communications initiated by the first or third communication devices to circuit-switched protocol communications for use by the second communication device, and
   transcoding circuit-switched protocol initiated by the second communication device to text over internet protocol communications for use by the first and third communication devices.

20. A first communication device, comprising:
a memory to store computer instructions; and
a processor coupled to the memory, wherein the processor, responsive to executing the computer instructions, performs operations comprising:
   receiving a request to facilitate a communication session;
   presenting a graphical user interface for requesting a communication identifier;
   receiving the communication identifier of a second communication device;
   submitting a request to a communication system to facilitate text over internet protocol communication session with the second communication device;
   wherein the request comprises the communication identifier of the second communication device,
   wherein the request causes the communication system to determine by way of a telephone number mapping server whether the second communication device operates according to one of a circuit-switched protocol or text over internet protocol,
   wherein the telephone number mapping server comprises a pre-existing entry indicating that the second communication device operates according to the circuit-switched protocol or the text over internet protocol, and
   wherein the pre-existing entry is provisioned at the telephone number mapping server during registration of the second communication device;
   responsive to the communication system determining that the second communication device operates according to the circuit-switched protocol,
      receiving a message initiated by the second communication device that has been transcoded by the communication system from a circuit-switched protocol message to a text over internet protocol message; and
      presenting in the graphical user interface a communication area for receiving the message from the second communication device.

21. The first communication device of claim 20, wherein the communication system facilitates establishment of the communication session between the first and second communication devices according to text over internet protocol responsive to detecting that the second communication device operates according to text over internet protocol.

22. The first communication device of claim 20, wherein the communication system operates according to one of an internet protocol multimedia subsystem communication network, an internet protocol television communication network, a cable television communication network, or a satellite television communication network, wherein the first or second communication devices correspond to one of a set-top box, a cellular phone, a computer terminal, or a telecommunications device used by a user who is deaf, wherein the telecommunications device used by the user who is deaf operates in a public switched telephone network, and wherein text over internet protocol communications utilize a session initiation protocol.

23. The first communication device of claim 20, comprising a keyboard and a navigation device for exchanging messages with the second communication device by way of the communication area in the graphical user interface, wherein the keyboard is operably coupled to the processor by a tethered interface or a wireless interface, and wherein the wireless interface operates according to one of a Bluetooth protocol or a wireless fidelity protocol.

24. The first communication device of claim 20, wherein the communication identifier corresponds to one of an E.164 number or a session initiation protocol uniform resource identifier.

25. The first communication device of claim 20, comprising a voice coder and decoder, wherein the processor, responsive to executing the computer instructions, performs operations comprising:
- detecting that the communication system has an outage in internet protocol services;
- enabling the voice coder and decoder for engaging in a telecommunications device for a deaf user communication session; and
- submitting a request to the communication system to engage in the telecommunications device for the deaf user communication session with the second communication device.

26. A first communication device, comprising
a memory storing computer instructions; and
a processor coupled to the memory, wherein the processor, responsive to executing the computer instructions, performs operations comprising:
- receiving a request to engage in a communication session;
- presenting a graphical user interface for requesting a communication identifier;
- receiving the communication identifier of a second communication device;
- submitting a request comprising the communication identifier of the second communication device to a telephone number mapping server to determine whether the second communication device operates according to one of a circuit-switched protocol or a real-time text over internet protocol, wherein the telephone number mapping server comprises a pre-existing entry enabling the determination, and wherein the pre-existing entry is provisioned during registration of the second communication device;
- responsive to detecting that the second communication device operates according to the circuit-switched protocol, and the second communication device corresponds to a telecommunications device for a deaf user:
  - enabling a voice codec for facilitating establishment of a communication session with the telecommunications device for the deaf user, and
  - facilitating establishment of the communication session with the telecommunications device for the deaf user utilizing the voice codec; and
- responsive to detecting that the second communication device operates according to text over internet protocol, establish the communication session with the second communication device according to text over internet protocol.

* * * * *